United States Patent
Wyble et al.

(10) Patent No.: US 8,422,036 B2
(45) Date of Patent: Apr. 16, 2013

(54) EDGE SENSING APPARATUS AND METHOD REDUCING SHEET FLY HEIGHT ERROR

(75) Inventors: Thomas J. Wyble, Williamson, NY (US); Lloyd A. Williams, Mahopac, NY (US)

(73) Assignee: Xerox Corporation, Norwalk, CT (US)

( * ) Notice: Subject to any disclaimer, the term of this patent is extended or adjusted under 35 U.S.C. 154(b) by 371 days.

(21) Appl. No.: 12/647,278

(22) Filed: Dec. 24, 2009

(65) Prior Publication Data
US 2011/0157604 A1 Jun. 30, 2011

(51) Int. Cl.
*G01B 11/14* (2006.01)
*G01N 21/84* (2006.01)

(52) U.S. Cl.
USPC .......................................... 356/621; 356/431

(58) Field of Classification Search .......... 356/429–431, 356/621
See application file for complete search history.

(56) References Cited

U.S. PATENT DOCUMENTS

| | | | |
|---|---|---|---|
| 4,288,160 A * | 9/1981 | Lodzinski | 356/73 |
| 5,270,778 A | 12/1993 | Wyer | |
| 5,751,443 A | 5/1998 | Borton et al. | |
| 6,794,633 B2 | 9/2004 | Iwasaki | |
| 6,853,393 B2 * | 2/2005 | Akita | 347/129 |
| 7,548,316 B2 | 6/2009 | Castillo et al. | |
| 2008/0018913 A1 | 1/2008 | Ossman et al. | |

FOREIGN PATENT DOCUMENTS

WO WO 2009/011079 * 1/2009

* cited by examiner

*Primary Examiner* — Tara S Pajoohi Gomez
(74) *Attorney, Agent, or Firm* — Hoffmann & Baron, LLP

(57) ABSTRACT

An edge sensing apparatus is disclosed including first and second emitters, first and second detectors and a timer. Beams radiated from the first emitter being emitted in an opposite direction from beams radiated from the second emitter. The first and second detectors being aligned to receive beams from the first and second emitters respectively, where the first detector is offset in a cross-process direction from the first emitter and/or the second detector. The timer receiving signals from both the first and second detectors, wherein a change of the signals determines a position of an edge of a substrate media sheet causing the change of signals. Also, an edge sensing method is disclosed including measuring a mean time associated with a change of signals received from the two detectors and determining a location of a sheet edge causing the change of signals based on the mean time.

20 Claims, 6 Drawing Sheets

EDGE SENSING APPARATUS AND METHOD REDUCING SHEET FLY HEIGHT ERROR

TECHNICAL FIELD

Presently disclosed technologies are directed to handling assemblies for sheets of substrate media, particularly in substrate media handling assemblies. The methods and apparatus in the various embodiments herein are also related to the reduction of sheet fly height errors with regard to edge sensors used in sheet handling assemblies such as printers and other electrophotographic machines.

BACKGROUND

Contemporary sheet substrate media edge sensors include a light emitter as well as a receiver for detecting the emitted light. As shown in FIG. 7, a sensor 120 is disposed along the sheet travel path P and disposed to radiate light across two baffles 110, 112 for guiding sheet movement there between. The shortest distance from the lower baffle 112 to sheet is referred to as the "fly height" of the sheet. The sensor 120 includes a light emitter 122 that transmits a cone-shaped beam of light 123 which is radiated expanding outwardly in a cone-shape toward a reflector 114 that also generates a cone-shaped reflection beam 124 heading back towards the sensor's detector 128. The sensor 120 detects the presence of a sheet when light no longer reaches the detector 128, generally because the sheet has blocked the light 124. The first instance that the detector 128 stops receiving a signal is generally associated with the arrival of the leading edge of a sheet. It should also be understood that the inverse would be true for timing the trailing edge of a sheet passing a particular point in the system. The angled outer edges of at least the reflected light cause the receiver to detect the presence of a sheet at different times depending on how high the sheet is traveling along the media path (fly height). Thus, a sheet with a higher fly height 15 will start blocking the light 124 earlier along the sheet path P than a sheet with a lower fly height 16. In this way, any deviation from a sheet traveling at a fly height that is equidistant from both the upper and lower baffles 110, 112, will yield an error in detecting the position of a sheet at the point of arrival (when it is first detected by the sensor). This error is referred to herein as fly height error. This effect causes any trailing edge measurements to also have errors due to fly height. Measurements of a typical sensor 120 will have as much as 0.2 mm of error, based on a 3 mm variation in sheet fly height.

One contemporary solution to such leading edge fly height errors is to angle the sensor such that the outer conical edge of the receiving beam has a more vertical configuration, thus minimizing the fly height error. However, such a configuration while reducing leading edge fly height errors, makes errors relating to trailing edge detection even worse. Accordingly, the angled sensor configuration is typically not used for trailing edge sensing.

Accordingly, it would be desirable to provide a system and/or method which can have precise sheet edge sensing and thus overcomes the shortcoming of the prior art. In particular, a system and/or method in accordance with aspects of the disclosed technologies preferably reduces fly height error and enables accurate leading and trailing edge detection, sheet registration, sheet size detection and other sheet handling functions.

SUMMARY

According to aspects described herein, there is disclosed a sheet edge sensing apparatus for a substrate media handling assembly. The handling assembly conveying sheets of substrate media in a process direction along a path. A cross-process direction extends substantially laterally to the process direction. The edge sensing apparatus including first and second emitters, first and second detectors and a timer. Beams being radiated from the first emitter and those beams being emitted in at least partially an opposite direction from beams radiated from the second emitter. The first and second detectors being aligned to receive beams from the first and second emitters respectively. The first detector is offset in a cross-process direction from at least one of the first emitter and the second detector. Additionally, a timer receives signals from both the first and second detectors, wherein a change of the signals determines a position of an edge of a substrate media sheet causing the change of signals.

Additionally in the sheet edge sensing apparatus, a sheet position can be determined using both signals from the first and second detectors. Also, the first detector and the first emitter can be disposed on respective vertically opposite sides of the path. Additionally, the first detector and the first emitter can be disposed on the same vertical side of the path. Further, the first emitter can be disposed directly opposite the second emitter on a vertically opposed side of the path.

Further still, a substrate media moving along the path equidistant from the first and second detectors can interrupt the transmission beams from the first and second emitters approximately simultaneously. Also, the transmission beams can be light beams. Additionally, the change of the signals can be associated with and/or based on a fly height of the substrate media.

According to other aspects described herein, there is disclosed an edge sensing apparatus for a substrate media handling assembly. The handling assembly conveying sheets of substrate media in a process direction. Also, a cross-process direction extends substantially laterally to the process direction. The edge sensing apparatus includes a substrate media transport path, first and second light emitters, first and second light detectors and a timer. The substrate media transport path includes an opposed pair of baffles for conveying substrate media substantially in a process direction there between. Light from the first emitter is emitted in at least partially an opposite direction from light emitted from the second emitter. Also, the first and second light detectors are aligned to receive light from the first and second emitters respectively. The first light emitter is offset in a cross-process direction from at least one of the first light detector and the second light emitter. Further, a timer receives signals from both the first and second light detectors. The signals representing at least one of an interruption of the light by a substrate media sheet or the resumption of the light no longer blocked by the substrate media sheet, thereby determining a position along the path of at least one edge of the substrate media sheet.

Additionally, the apparatus can determine a sheet position using both signals from the first and second light detectors. The first light detector and the first light emitter can be disposed on respective opposite sides of the path. Also, the first light detector and the first light emitter can be disposed on the same side of the path. Additionally, the first light emitter can be disposed directly opposite the second light emitter on an opposed side of the path. Further, a substrate media moving along the path equidistant from the first and second light detectors can interrupt the light from the first and second light emitters approximately simultaneously. The timer can receive signals determining at least one of a sheet length and sheet velocity.

According to further aspects described herein, there is disclosed a method of sensing a sheet edge. The method includes measuring a mean time associated with a change of signals received from at least two light detectors facing in opposite directions to one another. At least one of the at least two light detectors is offset laterally from at least one of a light emitter and another of the at least two light detectors. The lateral offset being relative to a process direction along a sheet path. Also, the method including determining a location of a sheet edge causing the change of signals, the determination based on the mean time.

Additionally, the at least two light detectors can each be disposed to received light from one of two oppositely directed light emitters. The light from the at least two light emitters can cross one another. The two light detectors can be equally spaced relative to a central of a height of the sheet path. The method can further determine a location of a second sheet edge further causing the change of signals, thereby determining at least one of a sheet length and a sheet velocity. At least one light detector and at least one light emitter can be integrated into a single sensor.

These and other aspects, objectives, features, and advantages of the disclosed technologies will become apparent from the following detailed description of illustrative embodiments thereof, which is to be read in connection with the accompanying drawings.

DETAILED DESCRIPTION

Figure 1:
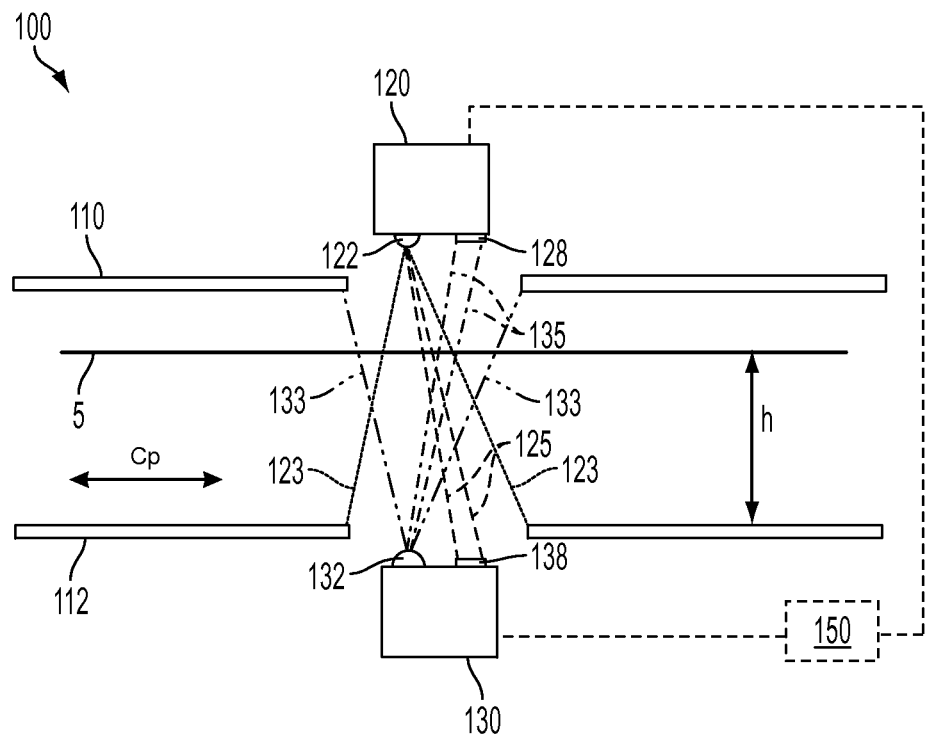
FIG. 1 is an elevation view of a sheet edge sensor apparatus viewed looking downstream a substrate media handling assembly path in accordance with an aspect of the disclosed technologies.

Describing now in further detail these exemplary embodiments with reference to the Figures. In accordance with aspects of the technologies disclosed herein, apparatus, systems and methods are disclosed for precise sheet edge sensing. In particular, a system and/or method that reduces fly height error, enables accurate leading and trailing edge detection, improves sheet registration, provides sheet size detection and/or other sheet handling functions. It should be understood that these apparatus, systems and methods can be used in one or more select locations of the paper path or paths of various conventional media handling assemblies. Thus, only a portion of an exemplary media handling assembly path are illustrated and discussed herein.

As used herein, a "printer," "printing assembly" or "printing system" refers to one or more devices used to generate "printouts" or a print outputting function, which refers to the reproduction of information on "substrate media" for any purpose. A "printer," "printing assembly" or "printing system" as used herein encompasses any apparatus, such as a digital copier, bookmaking machine, facsimile machine, multi-function machine, etc. which performs a print outputting function.

A printer, printing assembly or printing system as referred to herein are synonymous and can use an "electrostatographic process" to generate printouts, which refers to forming and using electrostatic charged patterns to record and reproduce information, a "xerographic process", which refers to the use of a resinous powder on an electrically charged plate record and reproduce information, or other suitable processes for generating printouts, such as an ink jet process, a liquid ink process, a solid ink process, and the like. Also, a printer can print and/or handle monochrome or color image data, as well as transfer or impress marks by indenting or raising a surface.

As used herein, "sheet," "sheet of paper" or "substrate media" are used interchangeably and refer to, for example, paper, transparencies, parchment, film, fabric, plastic, photo-finishing papers or other coated or non-coated substrate media in the form of a web upon which information or markings can be visualized and/or reproduced. While specific reference herein is made to a sheet or paper, it should be understood that any substrate media in the form of a web amounts to a reasonable equivalent thereto. Also, the "leading edge" of a substrate media refers to an edge of the sheet that is furthest downstream in the process direction.

As used herein, a "media handling assembly" refers to one or more devices used for handling and/or transporting a sheet, including feeding, printing, finishing, registration and transport systems.

As used herein, a "marking device" refers to one or more devices used to print, transfer and/or fix a mark onto a sheet, such as that used to form one or more images, marks, text or other indicia, such as electrophotography, iconography, magnetography or other re-imaging or marking processes. Such marking devices can include ink jet systems, image transfer assemblies that transfer one or more latent images or other systems that can apply one or more impressions.

As used herein, "sensor" refers to a device that responds to a physical stimulus and transmits a resulting impulse in the form of a signal for the measurement and/or operation of controls. Such sensors include those that use pressure, light, motion, heat, sound and magnetism. Also, each of such sensors as refers to herein can include one or more sensors for detecting and/or measuring characteristics of a substrate media, such as speed, orientation, process or cross-process position and even the size of the substrate media. Thus, reference herein to a "sensor" can include more than one sensor. Additionally, a sensor can include an emitter and/or a detector.

As used herein, an "emitter" or "photo-emitter" interchangeably refer to any device that gives off, discharges or sends out from itself beams of imponderable things, such as light, sound or other detectable emissions. Beams radiating from the emitter include at least one ray of emissions and can more generally include emissions spreading out in an expanding cone-shaped from the emitter. Also, as used herein, a "detector" or "receptor" interchangeably refer to any instrument or device which detects something, particularly the emissions from the emitter. The detection by the detector is generally indicated by generating or outputting a signal. Such a signal can be in the form of a change in voltage associated with the detector.

As used herein, "skew" refers to a physical orientation of the substrate media relative to the media handling assembly path in which it is being handled. In particular, skew refers to a misalignment, slant or oblique orientation of an edge of the substrate media relative to a process path.

As used herein, the terms "process" and "process direction" refer to a process of moving, transporting and/or handling a substrate media. The process direction substantially coincides with a direction of a flow path P along which the substrate media is primarily moved within the media handling assembly. A "lateral direction" or "cross-process direction" are used interchangeably herein and both refer to at least one of two directions Cp that generally extend sideways relative to the process direction. From the reference of a sheet handled in the process path, an axis extending through the two opposed side edges of the sheet and extending perpendicular to the process direction is considered to extend along a lateral or a cross-process direction Cp.

It should be noted that the illustrative drawings herein are not to scale. In fact, the angles and distances between surfaces depicted are generally exaggerated in order to more easily visualize and explain the methods, systems and apparatus in accordance with the disclosed technologies.

The particular aspects of the disclosed technologies are described below with reference to the drawings herein. However, it should be understood that such illustrations are non-limiting examples of those aspects and are merely included to illustrate at least some embodiments. The embodiments described herein are not intended to limit the scope of the invention herein.

FIG. 1 illustrates an edge sensing apparatus 100 for a substrate media handling assembly. The illustration is a partial cross-sectional view of a process path, looking in an upstream direction (the sheet heading toward the viewer). The handling assembly conveys sheets 5 of substrate media in a process direction (toward the viewer) between an upper baffle 110 and a lower baffle 112. A cross-process direction Cp extends laterally (horizontally in FIG. 1). This illustrative embodiment includes two sensors 120, 130 disposed on opposite vertical sides of the sheet path. Each sensor 120, 130 includes an emitter 122, 132 and a detector 128, 138. In this way, at least one emitter 122, 132 directs a conical beam of light in an opposite direction to at least one other emitter 122, 132. Additionally, at least one detector 128, 138 faces at least one of the two opposed emitters 122, 132. Each of the two detectors 128, 138 is aligned to receive light from an opposed emitter 122, 132. Also, each of the two detectors 128, 138 is offset in a cross-process direction Cp from one of the emitters 122, 132 and/or one of the other detectors 128, 138. It should be understood that contemporary optoelectronic reflective sensors can be used in accordance with the aspects of the disclosed technologies. Alternatively, other sensors could be used in accordance with further aspects of the disclosed technologies herein, to the extent that they emit and detect signals that are susceptible to errors due to sheet fly height h.

The emitters 122, 132 in accordance with the embodiments disclosed herein, need not be collimated beam systems, as such emitters are generally expensive. Thus, emitters 122, 132 need not generate collinear light beams that do not diverge. Rather, emitters 122, 132 if configured in accordance with aspect of the disclosed technologies can generate diverging beams of light, as illustrated, and still operate to sense sheet edges without being sensitive to sheet fly height variations.

The apparatus 100 arrangement shown in FIG. 1, in accordance with an aspect of the disclosed technologies provides two oppositely configured conical beams 123, 133, such as those produced by light. Additionally, a portion 125, 135 of those opposed beams 123, 133 will reach the opposed detectors 128, 138. It should be understood that each of the conical beams 123, 133, as well as the detected beam portions 125, 135 are narrower at their base (closest to the emitter) than at the opposed vertical side of the path P. Also, the conical shape (3-dimensional) of those beams 123, 125, 133, 135 extends into and out of the page. Thus, depending on the sheet fly height h, one of the two detected beam portions 125, 135 will first get interrupted by a sheet 5. For example, a sheet 5 with a low fly height h (below the vertical midpoint between the two baffles) will interrupt the downwardly emitted beam portion 125 first, whereas a sheet 5 with a high fly height h (above the vertical midpoint between the two baffles) will interrupt the upwardly emitted beam portion 135.

If two of the same sensors 120, 130 are symmetrically spaced relative to the sheet path P, then the midpoint between the two baffles 110, 112 will correspond to a planer region where the opposed beams of light cross the same space. Considering a typical spacing between such baffles 110, 112 is 40 mm, then a sheet fly height of precisely 20 mm would presumably get detected by both detectors 128, 138 at the same time, if they are laterally in-line with one another.

A controller 150 is used to receive sheet edge detection information from the sensors 120, 130. Such information is generally received by the controller 150 in the form of signals transmitted from the sensors 120, 130. The two sensors 120, 130 can be controlled similar to contemporary sensors, but with some additional parameters in order calculate the average sheet edge arrival time detected by both detectors 128, 138. Also, the proposed edge sensing apparatus 100 can be used to accurately detect a trailing edge departure time. What is more, if a sheet velocity is known or assumed (based on assembly nip velocities) the timing differential between the leading and trailing edges of a sheet can be used to precisely determine a sheet length using the edge sensing apparatus 100 as described herein. Alternatively, by knowing the sheet length in advance, the measurements of the leading and trailing edges can be used to more accurately measure sheet velocity. By averaging the output of both sensors 120, 130, and particularly the detectors 128, 138, the error due to the media's fly height h can be reduced. The edge sensing apparatus 100 as described in the various embodiments herein can reduce typical edge detection error due to fly height roughly by a factor of 10.

The sensors 120, 130 can be used by the controller 150 to generate a time stamp representing a time associated with the detection of a sheet edge (leading and/or trailing edge). Using the differential of the two time stamps as they relate to the same edge, the controller 150 operates as a timer by determining an average time representing a mean sheet edge arrival time (leading or trailing) that minimizes fly height errors. An additional advantage of the proposed embodiments is that the sensors 120, 130, emitters 122, 132 or detectors 128, 138 need not be precisely aligned in the process direction, since averaging of the outputs will take care of any misalignment.

The sensors 120, 130 and any other available input devices that can provide useful information regarding the sheet(s) being handled or transferred in the overall media handling assembly. The controller 150 can include one or more processing devices capable of individually or collectively receiving signals from input devices (such as detectors 128, 138), outputting signals to control devices (such as emitters 122, 132) and processing those signals in accordance with a rules-based set of instructions. The controller 150 can then transmit signals to one or more actuation systems, such as nip assemblies controlling the sheet speed, registration correction devices or other associated devices (not shown).

Figure 2:
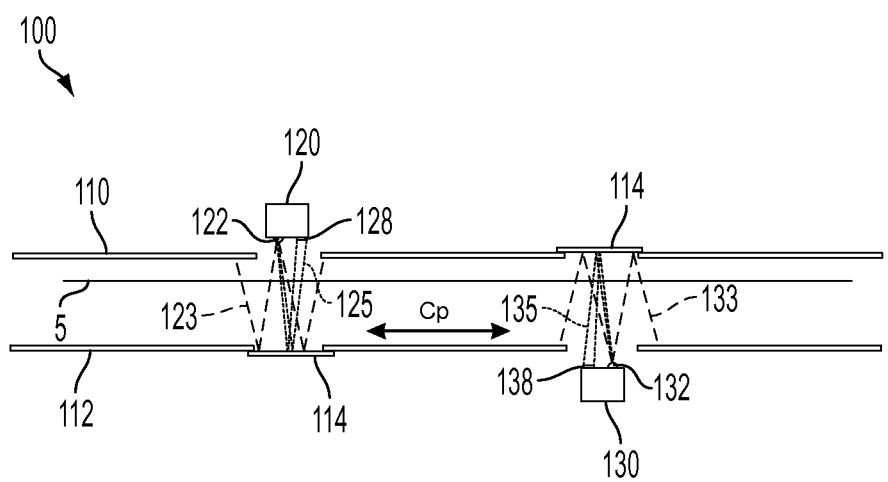
FIG. 2 is an elevation view of a sheet edge sensor apparatus viewed looking downstream a substrate media handling assembly path in accordance with another aspect of the disclosed technologies.

FIG. 2 illustrates an alternative embodiment of an edge sensor apparatus 100 in accordance with another aspect of the disclosed technologies. FIG. 2 shows a similar view, as if one were looking downstream. In this embodiment, the two sensors 120, 130 are disposed laterally offset from one another. Nonetheless, a first emitter 122 is oriented to direct emissions in an opposite direction to emissions from a second emitter 132. For example, such emitters 122, 132 could direct beams of light in opposite directions. Also, this embodiment includes a two detectors 128, 138 aligned to receive emissions, such as light, from the first and second emitters 122, 132 respectively. Also, as with the first embodiment above, the first detector 128 is offset in a cross-process direction Cp from the first emitter 122 and/or the second detector 138. The embodiment of FIG. 2 takes advantage of the detectors 128, 138 closest to the respective emitters 122, 132 from which they are detecting emissions. Thus, each of the emitters 122, 132 directs a beam across the process path P toward a reflector 114. In this way, the beams 123, 133 from the emitters 122, 132 reflect off the reflector, returning back toward the respective emitter 122, 132 and a portion of those beams 125, 135 are received by the detectors 128, 138. The paired emitters/detectors 122/128, 132/138 can each be integrated into a single combined sensor 120, 130. Alternatively, they could be formed separately, but merely disposed adjacent to one another. Generally, it is advantageous to laterally space the two sensors 120, 130 as close as possible without them causing interference to one another. Such close lateral proximity will avoid a sensitivity to sheet skew.

Figure 3:
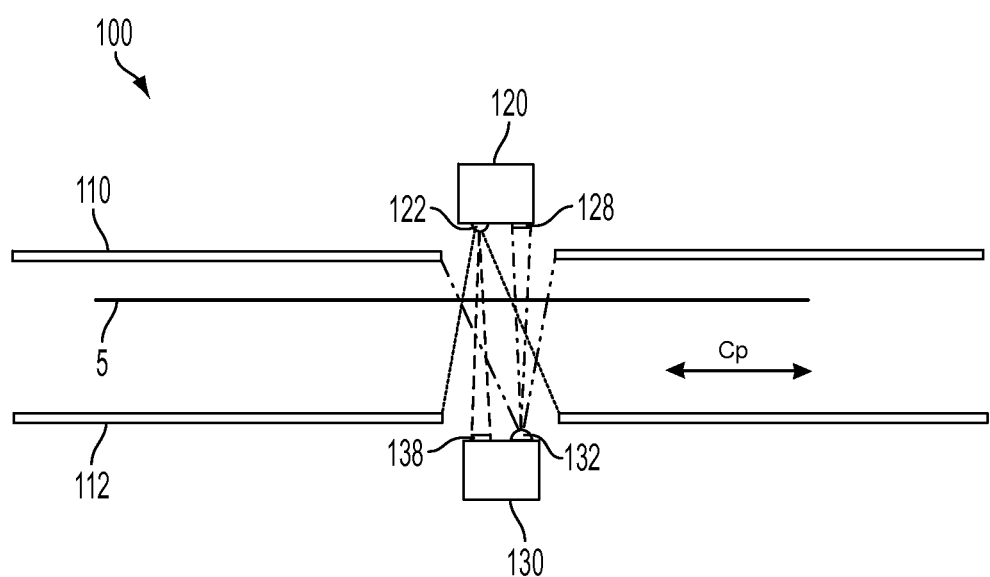
FIG. 3 is an elevation view of a sheet edge sensor apparatus viewed looking downstream a substrate media handling assembly path in accordance with yet another aspect of the disclosed technologies.

FIG. 3 illustrates a view of an apparatus 100 similar to that of FIG. 1, but with the lower of the two sensors 130 turned 180 degrees. In this configuration, the first sensor 120 includes a first emitter 122 that is disposed directly opposite to the second receiver 138 of the second sensor 130. Also, the second emitter 132 is similarly disposed directly opposite the first receiver 128. This embodiment of the disclosed technologies avoids the need for reflectors, although opposed alignment of sensors must be considered.

An alternative method for achieving an output which is minimally affected by fly height would be to angle one sensor to be used as a lead edge sensor and angle another sensor the opposite direction to be used as a trailing edge sensor. The reflectors could be angled to match the sensors. As desired, a reverse or opposite angled configuration could be provided for lead edge as opposed to the trail edge sensing.

Figure 4:
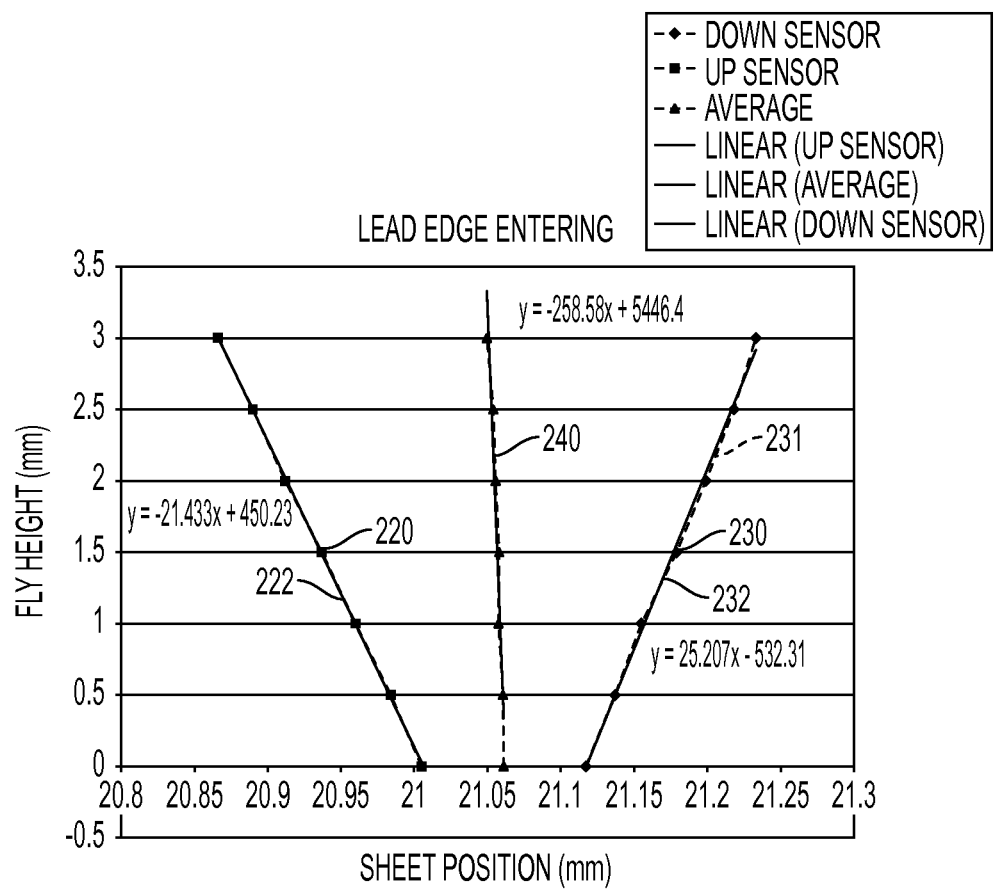
FIG. 4 is an illustrated plot of fly height verses sheet position measured from the leading edge of sheets in accordance with an aspect of the disclosed technologies.

FIG. 4 illustrates an example of test data provided by a an edge sensing apparatus in accordance with the disclosed technologies herein, measuring a position along the process path at which a sheet leading edge triggers the sensors relative to the sheet fly height. A downwardly aimed sensor (such as sensor 120 in FIG. 3), using light emitters and detectors, detects sheets at points 220 on the left side of the chart. A linear trend line 222 matches closely with the test result from that sensor, which corresponds to the linear equation y=−21.433x+450.23. An upwardly aimed sensor (such as sensor 130 in FIG. 3) detects sheets at points 230 on the right side of the chart. The test increments were achieved by manually advancing the sheets into a sensor, using mechanical cranks or guides. It should be noted that the test data for the upwardly aimed sensor generated a linear trend line 232 deviates slightly from a trend curve 231 generated by the actual sensor points 230. The linear trend line 232 corresponds to the linear equation y=25.207x−532.31. The central vertical trend line 240 shows the average of the two opposed sensor detection points 220, 230. This central trend line 240 corresponds to the linear equation y=−258.58x+5446.4 and indicates an error per millimeter of fly height variation equal to 0.004 mm. In contrast, individually trend line 222 indicates an error per millimeter of fly height variation equal to 0.047 mm, while trend line 232 indicates an error per millimeter of fly height variation equal to 0.040 mm.

Figure 5:
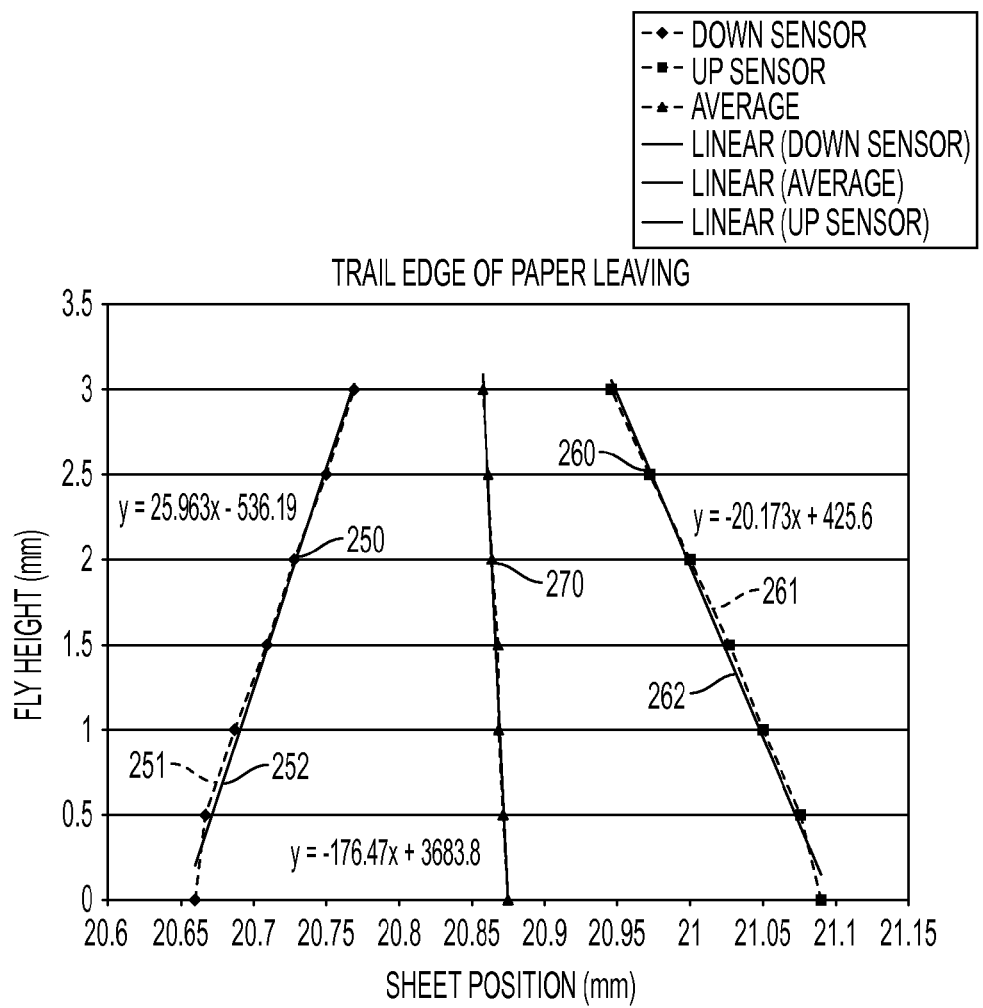
FIG. 5 is an illustrated plot of fly height verses sheet position measured from the trailing edge of sheets in accordance with an aspect of the disclosed technologies.

FIG. 5 illustrates an example of test data provided by a an edge sensing apparatus in accordance with the disclosed technologies herein, measuring a position along the process path at which a sheet trailing edge triggers the sensors relative to the sheet fly height. A downwardly aimed sensor (such as sensor 120 in FIG. 3) detects sheets at points 250 on the left side of the chart. A linear trend line 252 matches closely with the trend curve 251 corresponding to the test results from that sensor. That trend line 252 corresponds to the linear equation y=25.963x−536.19. An upwardly aimed sensor (such as sensor 130 in FIG. 3) detects sheets at points 260 on the right side of the chart. The test data for the upwardly aimed sensor generated a linear trend line 262 that deviates slightly from a trend curve 261 generated by the actual sensor points 260. The linear trend line 262 corresponds to the linear equation y=−20.173x+425.6. The central vertical trend line 270 shows the average of the two opposed sensor detection points 250, 260. This central trend line 270 corresponds to the linear equation y=−176.47x+3683.8 and indicates an error per millimeter of fly height variation equal to 0.006 mm. In contrast, individually trend line 252 indicates an error per millimeter of fly height variation equal to 0.039 mm, while trend line 262 indicates an error per millimeter of fly height variation equal to 0.050 mm. As with the leading edge results from FIG. 4, both test results indicate that fly height errors are virtually eliminated.

Figure 6:
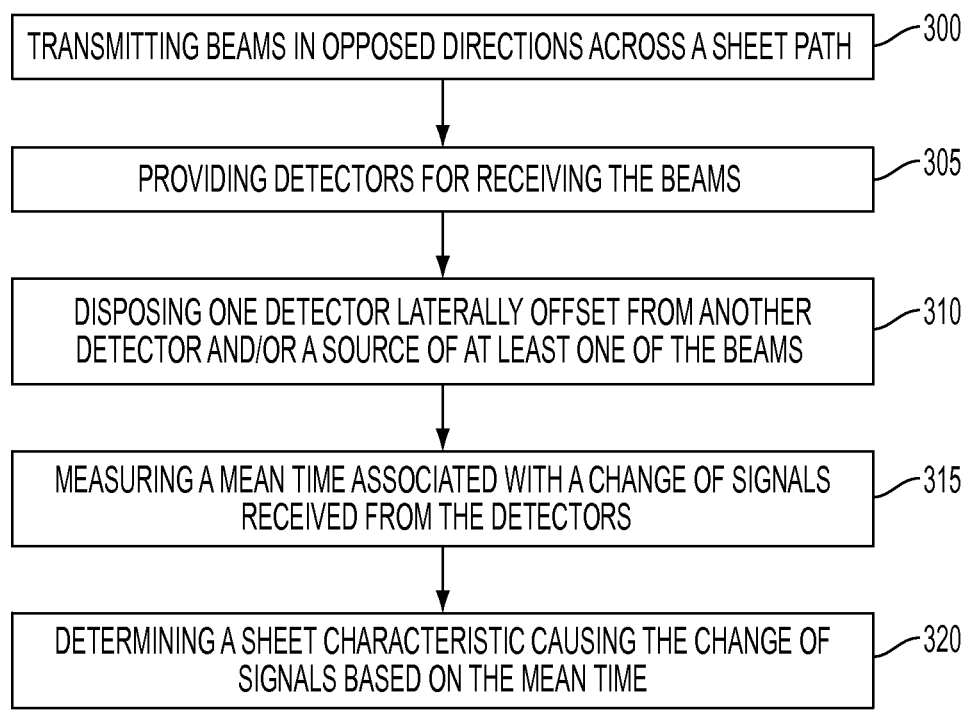
FIG. 6 illustrates a flow chart depicting a method of sheet edge sensing, which can be implemented in accordance with aspects of the disclosed technologies.
Figure 7:
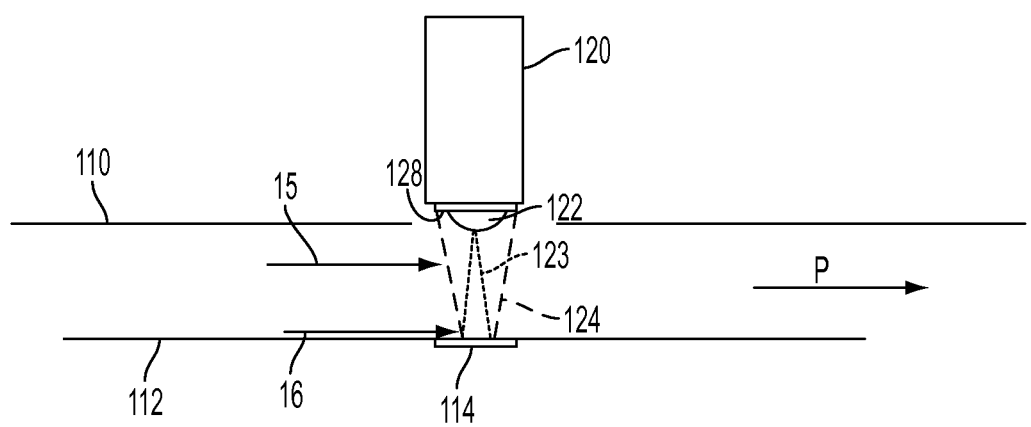
FIG. 7 is a side view of a prior art sensor apparatus disposed in a sheet process path.

FIG. 6 shows a flowchart for a sheet edge sensing method. It should be understood that the method described herein assumes that a substrate media handling assembly, including a sheet transport path is provided. Thus, block 300 shows that light is directed substantially in opposed directions across the sheet path, as more fully described with reference to the prior illustrative embodiments described above. Next, block 305 shows that detectors are provided for receiving the lights radiating from the emitters. Block 310 then shows that one of the detectors is laterally offset from another detector and/or a source of at least one of the radiated beams, such as transmitted lights. It should be understood that the steps of providing the detectors 305 and disposing the detectors 310 can be performed simultaneously. Thus, in combination with a controller the light emitters and light detectors can be used to measure a median time associated with a change of signals received from the detectors, as shown in block 315. It should be understood that such a change of signals represents a transition from the detectors receiving light to a time corresponding to the detectors not receiving the same level of light, or vise-versa. The early condition representing the arrival of a sheet leading edge and the latter condition representing the departure of a sheet trailing edge. In this way, block 320 shows how a determination can be made regarding a sheet characteristic causing the change of signals based on the median time. Such a determination 320 can correspond to a location of a sheet edge with the handling assembly at a particular time. Alternatively, such a determination 320 can correspond to the length of a sheet being handled within the assembly, if the sheet velocity is known. As a further alternative, such a determination 320 can correspond to a sheet velocity within the assembly, if the sheet length is known.

Often media handling assembly, and particularly printing systems, include more than one module or station. Accordingly, more than one registration system as disclosed herein can be included in an overall media handling assembly. Further, it should be understood that in a modular system or a system that includes more than one registration system, in accordance with the disclosed technologies herein, could detect characteristics of the image or sheet and relay that information to a central processor for controlling registration in the overall media handling assembly. Thus, if further image processing or additional images are to be transferred to a sheet, then this can be achieved with the use one or more subsequent downstream registration systems, for example in another module or station.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An edge sensing apparatus for a substrate media handling assembly, the handling assembly conveying sheets of substrate media in a process direction along a path, a cross-process direction extending substantially laterally to the process direction, the edge sensing apparatus comprising:
   a first emitter and a second emitter, beams radiated from the first emitter being emitted in at least partially an opposite direction from beams radiated from the second emitter;
   a first detector and a second detector, the first and second detectors being aligned to receive beams from the first and second emitters respectively, where the first detector is offset from the first emitter in a substantially lateral direction to the process direction, and the second detector is offset from the second emitter in a substantially lateral direction to the process direction, and the first detector and the first emitter are disposed on respective vertically opposite sides of the path, and the second detector and the second emitter are disposed on respective vertically opposite sides of the path; and
   a timer receiving signals from both the first and second detectors, wherein a change of the signals determines a position of an edge of a substrate media sheet causing the change of signals.

2. The apparatus of claim 1, wherein the timer receiving signals determines at least one of a sheet length and sheet velocity.

3. The apparatus of claim 1, wherein the timer further comprises the timer receiving signals from both the first and second light detectors, the signals representing at least one of an interruption of the light by a substrate media sheet or the resumption of the light no longer blocked by the substrate media sheet, thereby determining a position along the path of at least one edge of the substrate media sheet.

4. The apparatus of claim 1, further comprising a substrate media transport path including an opposed pair of baffles for conveying substrate media substantially in a process direction there between.

5. The apparatus of claim 1, wherein the first emitter is disposed directly opposite the second emitter on a vertically opposite side of the path.

6. The apparatus of claim 1, wherein a sheet position is determined using both signals from the first and second detectors.

7. The apparatus of claim 1, wherein a substrate media moving along the path equidistant from the first and second detectors interrupts the transmission beams from the first and second emitters approximately simultaneously.

8. The apparatus of claim 1, wherein the change of the signals is based on a fly height of the substrate media.

9. An edge sensing apparatus for a substrate media handling assembly, the handling assembly conveying sheets of substrate media in a process direction, a cross-process direction extending substantially laterally to the process direction, the edge sensing apparatus comprising:
   a first light emitter and a second light emitter, light from the first emitter being emitted in at least partially an opposite direction from light emitted from the second emitter;
   a first detector and a second detector, the first and second detectors being aligned to receive beams from the first and second emitters respectively, where the first detector is offset from the first emitter in a substantially lateral direction to the process direction, and the second detector is offset from the second emitter in a substantially lateral direction to the process direction, the first detector and the first emitter being disposed on the same vertical side of the path, the second detector and the second emitter being disposed on the same vertical side of the path;
   a reflector disposed in the beam between each emitter and the respective detector, the reflector being disposed on the opposite vertical side of the path to each emitter and the respective detector so as to reflect the beam from each emitter to the respective detector; and
   a timer receiving signals from both the first and second detectors, wherein a change of the signals determines a position of an edge of a substrate media sheet causing the change of signals.

10. The apparatus of claim 9, wherein the timer receiving signals determines at least one of a sheet length and sheet velocity.

11. The apparatus of claim 9, wherein the timer further comprises the timer receiving signals from both the first and second light detectors, the signals representing at least one of an interruption of the light by a substrate media sheet or the resumption of the light no longer blocked by the substrate media sheet, thereby determining a position along the path of at least one edge of the substrate media sheet.

12. The apparatus of claim 9, wherein a sheet position is determined using both signals from the first and second detectors.

13. The apparatus of claim 9, wherein a substrate media moving along the path equidistant from the first and second light detectors interrupts the light from the first and second light emitters approximately simultaneously.

14. The apparatus of claim 9, wherein the change of the signals is based on a fly height of the substrate media.

15. A sheet edge sensing method comprising:
   measuring a mean time associated with a change of signals received from at least two detectors facing in opposite directions to one another, wherein at least one of the at least two detectors is offset from a respective emitter in a substantially lateral direction to the process direction, and a reflector is disposed in the beam between each emitter and the respective detector, the reflector being disposed on the vertically opposite side of the path to each emitter and the respective detector so as to reflect the beam from each emitter to the respective detector; and
   determining a location of a sheet edge causing the change of signals, the determination based on the mean time.

16. The method of claim 15, wherein the at least two detectors are each disposed to receive radiating beams from a one of two oppositely directed emitters.

17. The method of claim 16, wherein the emitters are light emitters, whereby light from the emitters cross one another radiating in opposite directions.

18. The method of claim 15, wherein the at least two detectors are equally spaced relative to a central of a height of a sheet path.

19. The method of claim 15, further comprising:
 determining a location of a second sheet edge further causing the change of signals, thereby determining at least one of a sheet length and a sheet velocity.

20. The method of claim 15, wherein at least one of the detectors and at least one of the emitters are integrated into a single sensor.

\* \* \* \* \*